(12) United States Patent
Lee

(10) Patent No.: US 7,837,206 B1
(45) Date of Patent: Nov. 23, 2010

(54) WHEELED CARRIER SCOOTER

(76) Inventor: Freddy Theo Lee, 1502 SW 22$^{nd}$ Ave., Boynton Beach, FL (US) 33426

( * ) Notice: Subject to any disclaimer, the term of this patent is extended or adjusted under 35 U.S.C. 154(b) by 498 days.

(21) Appl. No.: 12/077,101

(22) Filed: Mar. 17, 2008

Related U.S. Application Data

(60) Provisional application No. 60/907,563, filed on Apr. 9, 2007.

(51) Int. Cl.
 *B62B 1/12* (2006.01)
 *B62B 3/02* (2006.01)
 *B62M 1/00* (2010.01)

(52) U.S. Cl. ............... 280/37; 280/30; 280/87.041; 280/87.05

(58) Field of Classification Search ........... 280/638, 280/639, 37, 38, 39, 40, 87.041, 87.05, 87.01, 280/30

See application file for complete search history.

(56) References Cited

U.S. PATENT DOCUMENTS 3,314,494 A * 4/1967 Weitzner ............... 180/208
3,413,011 A * 11/1968 Weitzner ............... 280/37
6,460,866 B1 * 10/2002 Altschul et al. ............... 280/30
6,688,614 B2 * 2/2004 Hsu ............... 280/37
6,802,409 B1 * 10/2004 Tiramani et al. ............ 190/18 A
7,029,015 B2 * 4/2006 Lin ............... 280/47.26
2004/0094919 A1* 5/2004 Roder et al. ............... 280/30
2009/0066045 A1* 3/2009 Turner et al. ............... 280/30

* cited by examiner

*Primary Examiner*—J. Allen Shriver, II
*Assistant Examiner*—John R Olszewski
(74) *Attorney, Agent, or Firm*—Alvin S. Blum

(57) ABSTRACT

A wheeled article carrier is operational in either one of two conditions. A frame with a horizontal base is supported by three or four wheels with a vertical member upstanding from the base. A receptacle may be attached to the frame. A telescoping handle extends above the frame. The frame may be pulled by the handle to roll on two of the wheels. A foot board is retracted to lie securely along the vertical member. In the second condition, the carrier becomes a scooter, with the foot board extending horizontally from the base, with two of the wheels supporting the distal end of the board and the proximal end of the board fixed to the base and supported by the one or two other wheels attached to the base. A steering mechanism connects the one or two wheels on the base to the handle so that the rider may steer the scooter.

8 Claims, 6 Drawing Sheets

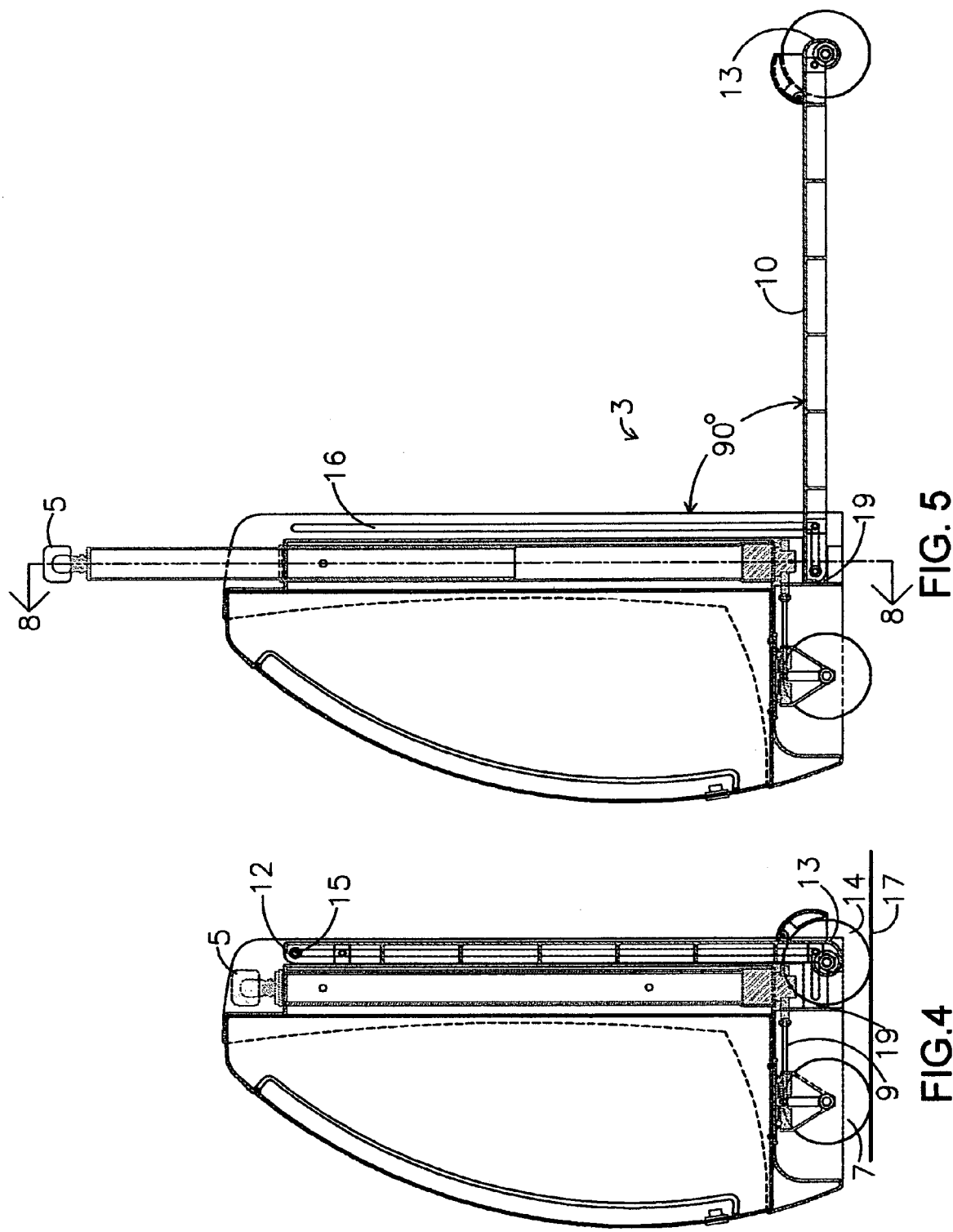

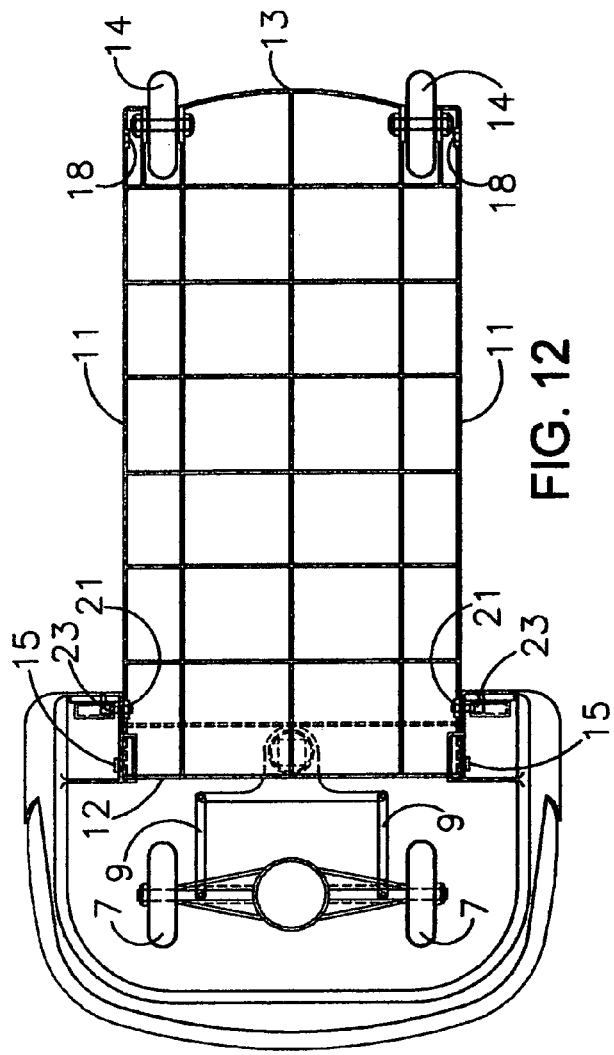
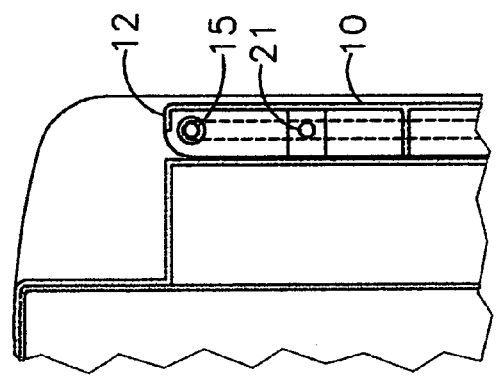
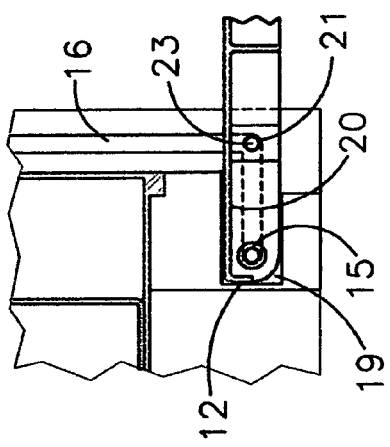
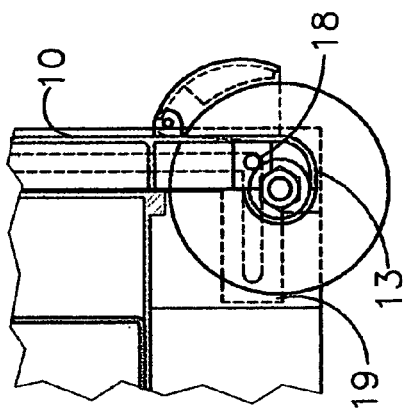

WHEELED CARRIER SCOOTER

Applicant claims the benefit of provisional patent application No. 60/907,563 filed Apr. 9, 2007 incorporated herein by reference in its entirety.

FIELD OF THE INVENTION

This invention relates generally to carriers for items, and more particularly combination wheeled carriers that can be converted to scooters with carriers.

BACKGROUND OF THE INVENTION

U.S. Pat. No. 6,460,866 to Altschul et al. teaches a combined wheeled vehicle and article carrier in which a pair of front wheels are mounted on a base below the carrier. A foot board is pivotally mounted at its front end to the base. The rear end of the foot board has a rear wheel so that the foot board may support a rider when the board is locked in horizontal position. The board may be rotated vertically to a retracted position with the rear wheel up. The device may then be trundled about by an uppermost handle while being supported only by the front wheels. But it does not stand securely on the two wheels.

U.S. Pat. No. 6,688,614 to Hsu teaches a combined wheeled vehicle and article carrier in which a pair of front wheels are mounted on a base below the carrier. A foot board is pivotally supported at its front end to the base. The rear end of the foot board has a rear wheel so that the foot board may support a rider when the board is in horizontal position. There are no provisions for fixing the foot board at right angles to the vertical in the horizontal position. This makes use as a scooter uncomfortable. The foot board may be lifted off the base. The board may be moved to a stable retracted vertical position. When being pulled by the handle in the retracted position, the assembly is not supported by a pair of rear wheels in what is the preferred function.

SUMMARY OF THE INVENTION

It is accordingly an object of the invention to provide a wheeled article carrier that is operational in either one of two positions or conditions. In the first condition, the carrier comprises a frame with a horizontal base stably supported by three or four wheels. A vertical member is upstanding from the base. An article carrying receptacle such as a box, hard-body case, or soft-body back-pack may be removably or fixedly attached to the frame. A telescoping handle is extendable above the frame. The frame may be pulled by the handle so as to roll on two of the wheels. A foot board is retracted to lie securely along the vertical member.

In the second condition, the carrier becomes a scooter, with the foot board extending horizontally from the base, with two of the wheels supporting the distal end of the board and the proximal end of the board fixed to the base and supported by the one or two other wheels attached to the base. The vertical member and handle remain fixed at right angles to the base to provide a secure grip for the rider. A steering mechanism connects the one or two wheels on the base to the handle so that the rider may steer the scooter. Means are provided for converting the device between retracted and extended positions while keeping the foot board captive.

These and other objects, features, and advantages of the invention will become more apparent from the detailed description of an exemplary embodiment thereof as illustrated in the accompanying drawings, in which like elements are designated by like reference characters in the various drawing figures.

BRIEF DESCRIPTION OF THE DRAWINGS

FIG. 4 is a vertical sectional view of the invention, with handle and foot board retracted.

FIG. 5 is a vertical sectional view of the invention, with handle and foot board extended.

FIG. 9 is a sectional detail view of a portion of the proximal portion of the foot board in retracted position.

FIG. 10 is a sectional detail view of a portion of the distal portion of the foot board in retracted position.

FIG. 11 is a sectional detail view of a portion of the proximal portion of the foot board in horizontal slot in extended position.

FIG. 12 is a bottom view in extended position.

DETAILED DESCRIPTION OF PREFERRED EMBODIMENTS

Figure 3:
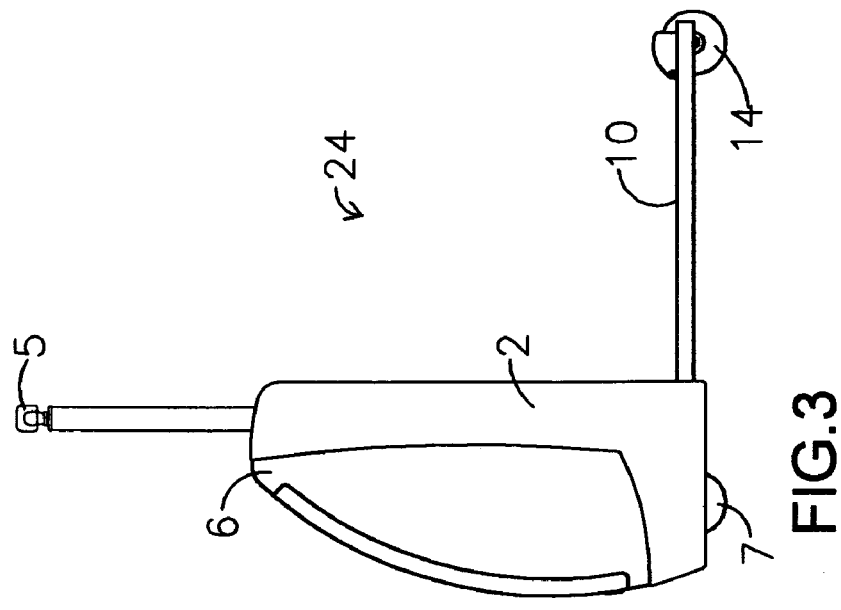
FIG. 3 is a side view of the invention ready for use as a scooter.
Figure 2:
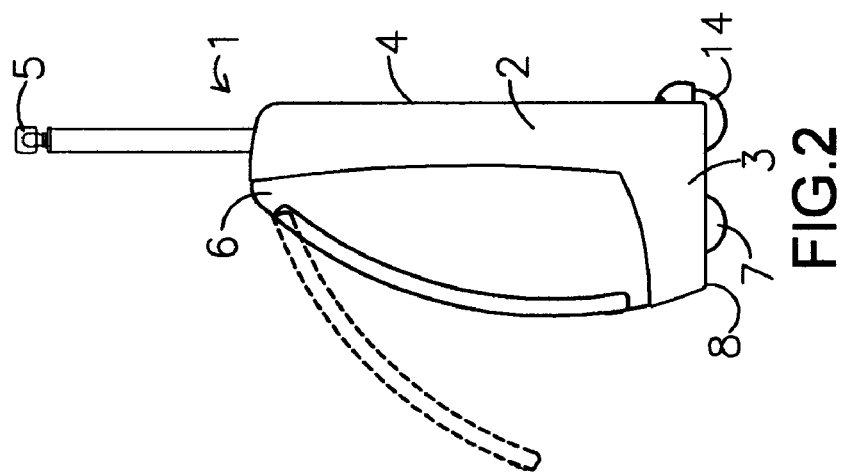
FIG. 2 is a side view of the invention with foot board retracted ready for pulling by the handle.
Figure 1:
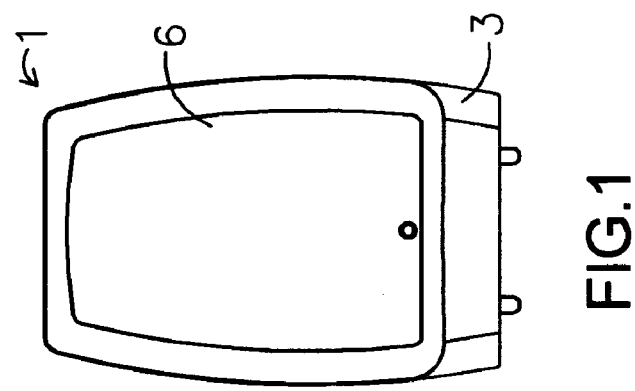
FIG. 1 is a front elevation view of the invention with handle retracted.
Figure 6:
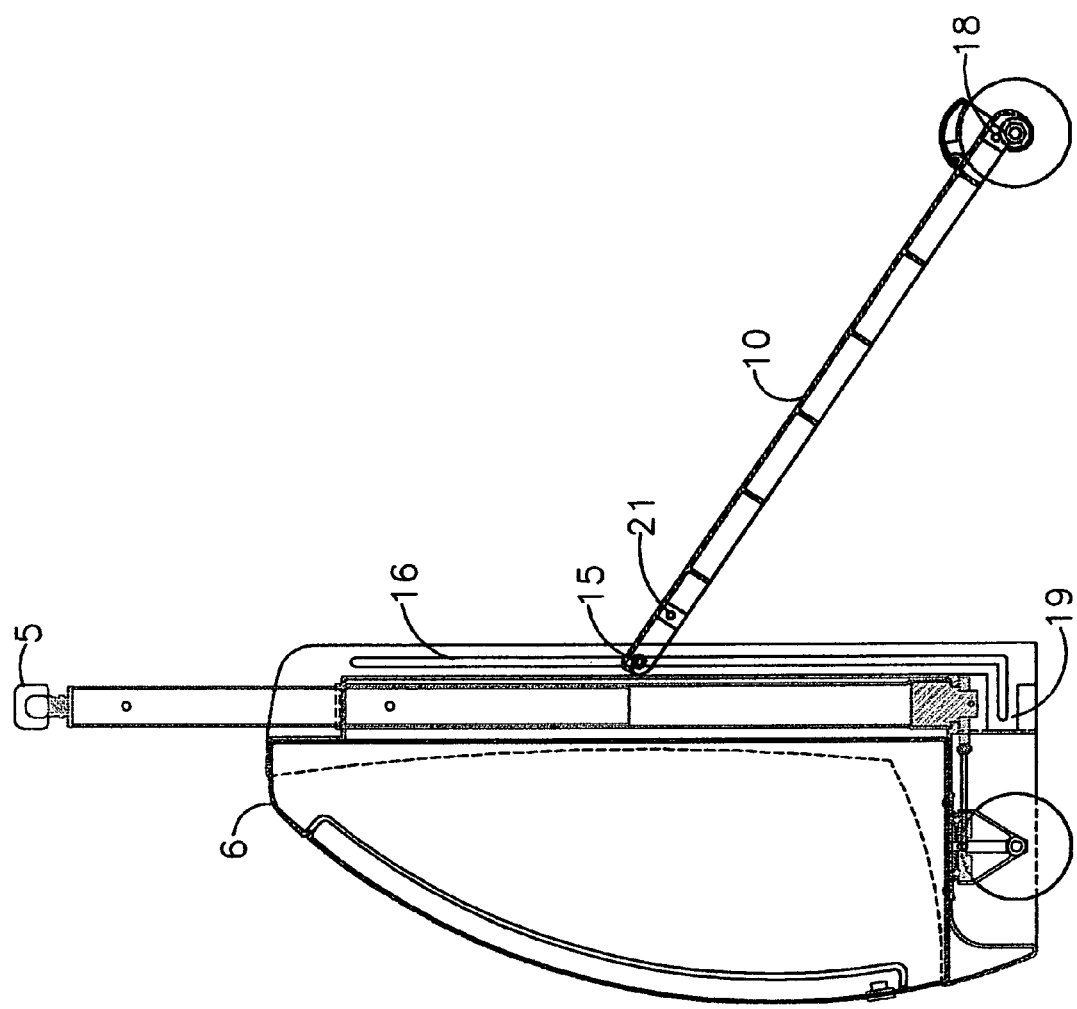
FIG. 6 is a vertical sectional view of the invention, with foot board partially extended.
Figure 8:
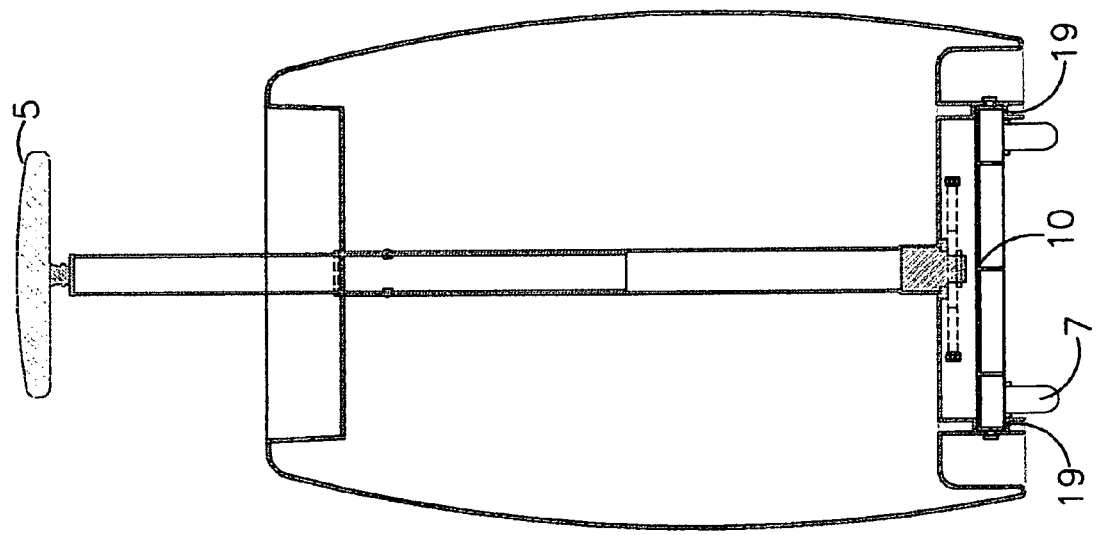
FIG. 8 is a sectional view through line 8-8 of FIG. 5.
Figure 7:
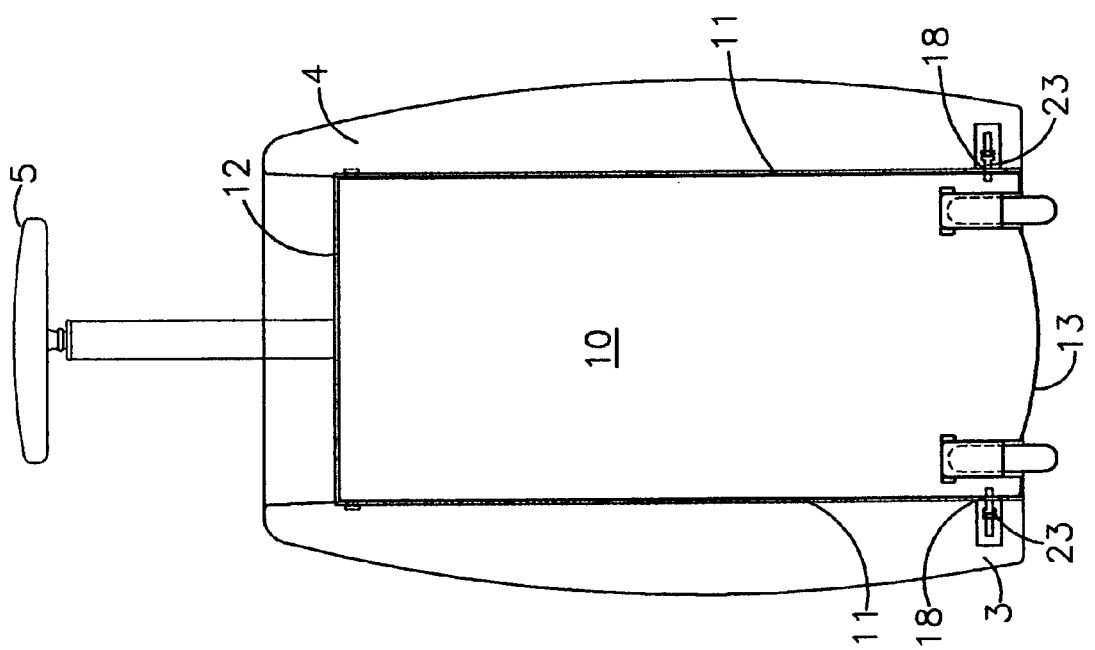
FIG. 7 is a rear elevation view of the invention with foot board retracted as in FIG. 2.

Referring now first to the drawing FIGS. 1, 2, and 7, a wheeled article carrier 1 has a rigid frame 2 having a horizontal base 3, a vertical member 4 extending upward from the base, and an extendable (telescoping) handle 5 extending upward from the vertical member. An article carrying case 6 is supported atop the base. It may be of hard or soft material or partially hard as desired. It may be fixed to the frame or removable. At least one front wheel 7 is rotatably mounted on the underside 8 of the base. An elongate foot board 10 has two opposed long sides 11, a short proximal end 12 and a short distal end 13. A pair of rear wheels 14 are rotatably mounted at the distal end 13. The foot board is rigid enough to support a rider in the scooter mode 24 shown in FIGS. 3, 5, and 12. As best seen in FIGS. 4 and 12, the handle is operatively connected through steering mechanism 9 to the front wheels 7 to enable steering in the scooter mode 24. The apparatus is convertible between a wheeled article carrier 1 to a rider-carrying scooter 24 by sliding the foot board between retracted position and extended position.

In the retracted position 1 the board 10 lies against the vertical member with the proximal end 12 uppermost and the distal end 13 adjacent the base, with the rear wheels resting in a common plane 17 with the front wheel or wheels, so that the carrier stands upright on all the wheels. In this position or mode of operation, the carrier may be pulled by the handle and it tilts over so that it is supported only by the rear wheels 14 to function as a wheeled carrier. A first latching means holds the distal end of the board against the vertical member in the retracted position. The latching means includes sliding bolts 23 mounted on the base that are received in recesses 18 in the long sides 11 of the board at the distal end.

In the extended position 24 the board 10 is held securely at right angles to the vertical member with its proximal end 12 held securely in the base and its distal end extending out from the base. This forms a scooter position or mode of operation in which the front wheel(s) support the front of the board and the rear wheels support the rear end of the board to support a rider thereon. The handle extends vertically at a fixed right angle to the base at a convenient level for holding and steering by a rider on the board. A second latching means holds the proximal end of the board in place on the base. The latching means includes sliding bolts 23 mounted on the base that are received in recesses 21 in the long sides 11 of the board at the proximal end. The sliding bolts 23 that serve both latching means may be the same.

The structure provided for converting between retracted and extended positions includes two lateral projections 15 that extend from the two long sides of the board at the proximal end. A pair of opposed vertical guide slots 16 are mounted on the back of the vertical member. They are dimensioned and positioned to receive therein the lateral projections 15 of the foot board to hold the foot board in retracted position against the vertical member with the proximal end uppermost. A pair of horizontal opposed guide slots 19 are mounted to the underside 8 of the base 3. They are dimensioned and positioned to receive therein the proximal ends 20 of the long sides of the board in the extended position. to securely hold the front end of the board at right ends to the vertical member during use as a steerable scooter.

Figure 16:
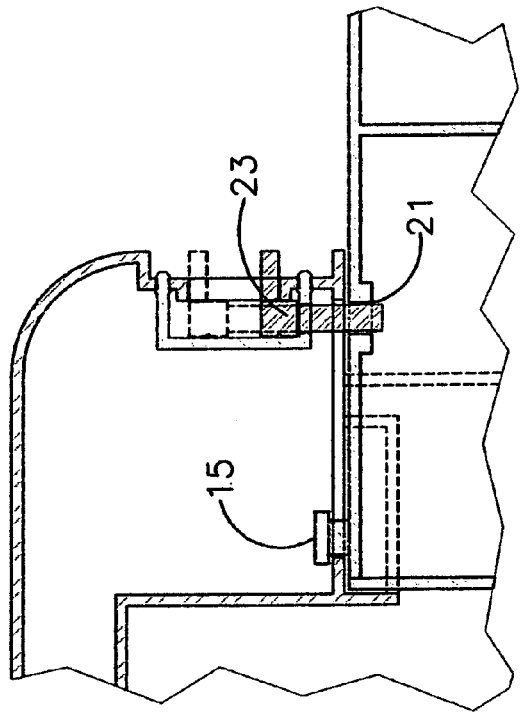
FIG. 16 is a perspective view of another embodiment of the invention.
Figure 15:
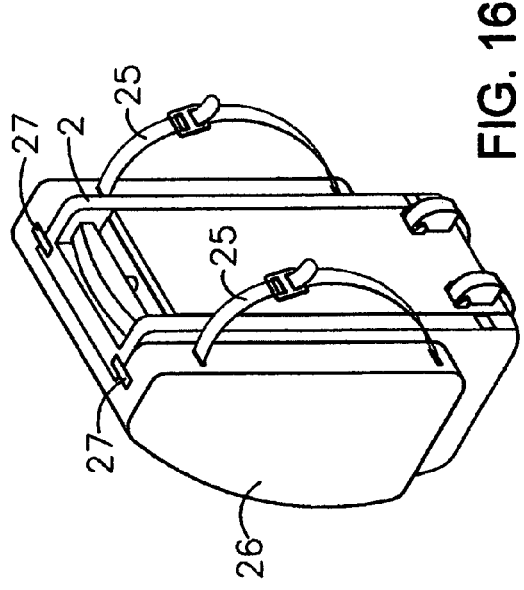
FIG. 15 is a sectional horizontal detail view of proximal portion of the foot board in horizontal guide slot and locked in place.
Figure 13:
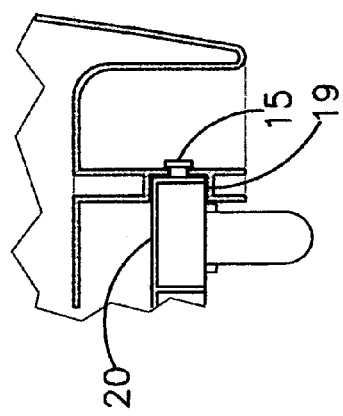
FIG. 13 is a sectional vertical detail view of a portion of the proximal portion of the foot board in horizontal guide slot.
Figure 14:
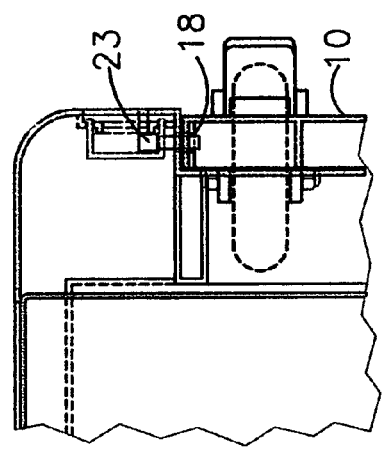
FIG. 14 is a sectional horizontal detail view of the foot board in retracted position and locked in place.

Referring now to FIG. 16, another embodiment of the invention is shown that includes a backpack 26 that may be all fabric or partially fabric with shoulder straps 25. This backpack may be removably attached to the frame 2' by connectors 27. When connected to the frame, it enjoys all the attributes disclosed supra. The backpack may be easily detached from the frame and carried about like an ordinary backpack. For school use, the frame may be left in a locker during school hours and attached for traveling to and from school.

While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. A wheeled article carrier convertible to a rider-carrying scooter comprising:
   a rigid frame having a horizontal base and a vertical member affixed to the base and extending upward from the base;
   an extendable handle on the frame extending above the vertical member;
   an article carrying case supported atop the base;
   at least one front wheel rotatably mounted to the base underside;
   the handle operatively connected to the at least one front wheel for steering function;
   an elongate foot board having two opposed long sides, a proximal short end and a distal short end;
   a pair of opposed rear wheels rotatably mounted at the distal end;
   two lateral projections extending from the two long sides at the proximal end;
   a pair of opposed vertical guide slots mounted on the vertical member positioned and dimensioned to slidably receive therein the lateral projections to support the foot board in a retracted position with the proximal end uppermost and the rear wheels in a common plane with the at least one front wheel to enable the frame to stand upright on all the wheels and to provide for supporting the frame on only the rear wheels when being pulled by the handle;
   first latching means to maintain the foot board in retracted position;
   a pair of opposed horizontal guide slots mounted to the base underside to receive therein the proximal end of the two long sides to support the foot board in extended position with all the wheels supporting the frame and the handle in vertical position to securely support the steerable scooter function; and
   second latching means to maintain the foot board in extended position.

2. The carrier according to claim 1 in which the case is removably attached to the frame.

3. The carrier according to claim 2 in which first and second latching means employ common sliding bolts.

4. The carrier according to claim 1 in which first and second latching means employ common sliding bolts.

5. The carrier according to claim 1 in which the foot board is held captive to the frame when converting between retracted and captive positions.

6. A rigid frame having a horizontal base and a vertical member affixed to the base and extending upward from the base;
   an extendable handle on the frame extending above the vertical member;
   at least one front wheel rotatably mounted to the base underside;
   the handle operatively connected to the at least one front wheel for steering function;
   an elongate foot board having two opposed long sides, a proximal short end and a distal short end;
   a pair of opposed rear wheels rotatably mounted at the distal end;
   two lateral projections extending from the two long sides at the proximal end;
   a pair of opposed vertical guide slots mounted on the vertical member positioned and dimensioned to slidably receive therein the lateral projections to support the foot board in a retracted position with the proximal end uppermost and the rear wheels in a common plane with the at least one front wheel to enable the frame to stand upright on all the wheels and to provide for supporting the frame on only the rear wheels when being pulled by the handle;
   first latching means to maintain the foot board in retracted position;
   a pair of opposed horizontal guide slots mounted to the base underside to receive therein the proximal end of the two long sides to support the foot board in extended position with all the wheels supporting the frame and the handle in vertical position to securely support the steerable scooter function; and
   second latching means to maintain the foot board in extended position.

7. The carrier according to claim 6 in which first and second latching means employ common sliding bolts.

8. The carrier according to claim 6 in which the foot board is held captive to the frame when converting between retracted and captive positions.

* * * * *